Nov. 17, 1959 H. W. FULLER ET AL 2,913,536

MAGNETIC HEAD ASSEMBLIES

Filed Feb. 17, 1956 3 Sheets-Sheet 1

INVENTORS
HARRISON W. FULLER
SIDNEY P. WOODSUM
WILLIAM T. DAROU JR.

BY Joseph Weingarten
ATTORNEY

INVENTORS
HARRISON W. FULLER
SIDNEY P. WOODSUM
WILLIAM T. DAROU JR.

BY Joseph Weingarten
ATTORNEY

Nov. 17, 1959 H. W. FULLER ET AL 2,913,536

MAGNETIC HEAD ASSEMBLIES

Filed Feb. 17, 1956 3 Sheets-Sheet 3

INVENTORS
HARRISON W. FULLER
SIDNEY P. WOODSUM
WILLIAM T. DAROU JR.

BY Joseph Weingarten
ATTORNEY

United States Patent Office 2,913,536

Patented Nov. 17, 1959

2,913,536

MAGNETIC HEAD ASSEMBLIES

Harrison W. Fuller, Boston, Sidney P. Woodsum, Groton, and William T. Darou, Jr., Westwood, Mass., assignors to Laboratory For Electronics, Inc., Boston, Mass., a corporation of Delaware Application February 17, 1956, Serial No. 566,261

23 Claims. (Cl. 179—100.2)

The present invention relates in general to new and improved means for processing information in magnetic data storage systems.

The term processing information is taken as descriptive of the process of recording data, i.e., the transfer of information into the storage system, as well as the reading of data out of the system. In the following discussion, for the sake of clarity, reference will be had to the recording of data, it being understood that the improvements discussed herein are equally applicable when data is read out.

In general, the term magnetic recording relates to a process whereby data is stored in a magnetic medium, the data to be stored being transferred to the recording surface of the magnetic medium by means of a magnetic head. The data signals may be in analog or digital form having spectral components at audio frequencies or higher. Magnetic storage systems are peculiarly adapted to the processing of data reduced to binary code notation. In such notation the data is reduced to binary digits or bits, one bit of data being represented by either a Zero or a One pulse.

The number of bits of data which may be stored per linear inch of recording surface is limited, among other factors, by the spacing of the pole pieces of the magnetic head from the recording surface of the magnetic medium. The pole pieces are separated from each other by a short gap and terminate in a common pole face surface having the gap traverse its width. Magnetic flux lines are set up between the pole pieces across the gap, the fringing flux lines encountering the recording surface and magnetizing a predetermined portion thereof. A short gap is necessary to yield high resolution when recording as well as when reading out data. The ratio between gap length and wavelength of stored data should not exceed 1:4. For example, in high density recording of the order of 1000 bits per inch, the gap length should not exceed ¼ mil. The spacing of the pole face surface from the recording surface, as measured at the gap, is in large part responsible for the spreading of magnetic flux between these surfaces. When flux spreading occurs, the lines of flux, which fringe between the two pole pieces, magnetize a greater than desired portion of the recording surface. In magnetic data storage systems where the wavelength of the recorded information measured along the recording medium is relatively short, for example, high-density digital data storage systems where the number of bits to be stored per linear inch may exceed one thousand, minimum flux spreading is required to concentrate the magnetic field and bring about high resolution of data. Accordingly, minimum spacing between the surfaces, as measured at the gap, is necessary.

In the past, different solutions to this problem have been attempted with varying degrees of success. In-contact recording, where the spacing between the surfaces is zero and the pole pieces ride in contact with the recording surface, while eliminating flux spreading due to the separation of the surfaces, entails the problem of wear due to abrasion, chipping and scoring of the pole face surface and of the medium recording surface. Chipping of the pole face surfaces in the vicinity of the gap between the pole pieces is particularly pronounced when ferrite heads are used. To a certain extent abrasive wear may be alleviated in in-contact recording apparatus by means of boundary (thin film) lubrication. However, in long term usage the loss of pole piece material due to abrasion and, more significantly, in the case of ferrite, due to chipping, still presents an important problem. It must be kept in mind that the loss of a 10 mil chip in the vicinity of the gap may represent the loss of one third of the width of a 30 mil wide pole surface and hence, may result in the loss of data. Of even greater importance is the fact that chipping in the vicinity of the gap may increase effective gap length thereby reducing resolution in reading out data, as well as reducing the practical linear bit density which may be recorded.

The physical separation between the pole face surface and the recording surface which will maintain tolerable flux spreading in high-density magnetic recording of the order of 1000 bits per inch, is approximately 0.2 mil as measured at the gap of the pole face surface. The mechanical problem of fixedly mounting a multitude of magnetic heads to have their pole face surfaces at a distance of 0.2 mil from a moving multi-track recording surface is staggering and the cost is prohibitive, where ambient temperature changes alone may account for a variation in the separation spacing of more than 0.2 mil. Similarly, lack of uniformity in the recording surface, or eccentricity in the mounting of the magnetic surfaces, may occasion substantial variations of the spacing. In another solution to this problem, air is blown against the recording surface through a nozzle attached to each individual head or head mount. The Venturi forces brought about by the escape of air from the space between the recording surface and the pole face surface of the head, float the latter out of contact with the recording surface at a distance dependent partially upon the air pressure which is maintained. This arrangement is extremely complex when it is considered that the individual head mounts must be movably arranged to vary the spacing between the surfaces in response to small air pressure changes, while at the same time carrying the air nozzles and a portion of the air supply means. Additionally, constant separation of the surfaces is critically dependent upon constant air pressure.

It will be appreciated that a need exists for improved methods of out-of-contact processing of information in short wave-magnetic data storage systems and simple means for carrying out the same.

Accordingly, it is an object of this invention to provide new and improved means for processing information in short wavelength magnetic data storage systems which are not subject to the foregoing disadvantages.

It is an additional object of this invention to provide apparatus in high density magnetic data storage systems capable of utilizing a hydrodynamic effect of an applied fluid to maintain constant separation between the pole face surface of a magnetic head and the recording surface of a magnetic medium.

It is a further object of this invention to provide magnetic head assemblies for use in high-density magnetic data storage systems.

It is another object of this invention to provide magnetic head members and head mounts therefor, for use in high-density magnetic data storage systems.

These and other novel features of the invention together with further objects and advantages thereof will become more apparent from the following detailed specification with reference to the accompanying drawings, in which.

Figure 1:
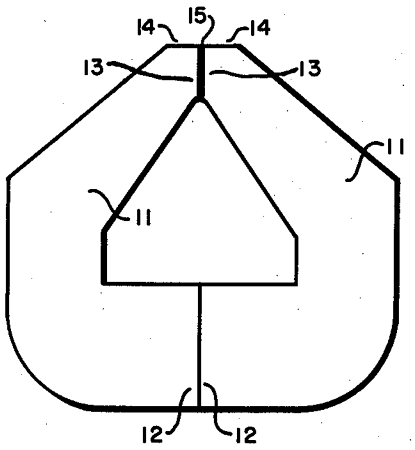
Fig. 1 illustrates the pole pieces used in the magnetic recording head.

In practicing the invention to obtain the above objects, the principle of fluid dynamics utilized herein is referred to as hydrodynamic or thick-film lubrication. The techniques employed in the application of this principle are more fully set forth in a co-pending application by Harrison W. Fuller and Carl W. Ledin entitled "Magnetic Data Storage Techniques," Serial No. 564,229 filed February 8, 1956 and further identified as LFE Docket No. P–44. In hydrodynamic lubrication, contact between the two surfaces being lubricated is completely avoided. In contradistinction thereto, in the more familiar thin-film lubrication at least partial contact of the surfaces may be expected. A plane slider bearing is an example of a configuration which utilizes hydrodynamic lubrication. Here, a load is supported by a rectangular pad, the surface of which presses upon a bearing surface. Relative lateral motion between the two surfaces is initiated and a lubricating fluid is maintained in the space between them. Hydrodynamic lubrication will take place if the surfaces are maintained at a tilt angle with respect to each other. This angle is dependent upon the pad geometery, the position of the point of load application to the pad, the magnitude of the load, the relative velocity of the surfaces, the viscosity of the fluid and, in the case of a pivotally mounted surface, the position of the pivot axis. In one form of the plane slider bearing, the pad is pivoted about a line axis which is positioned off the center of the pad away from the leading edge of the pad surface. The leading edge of the pad surface is defined as the edge which first encounters the bearing surface due to the relative lateral motion of the two surfaces. The load is applied to the pad at the pivot axis. The motion of the lubricant between the two surfaces is such as to produce a positive (supporting) pressure distribution along the length of the pad. This pressure distribution results in a movement about the pivot axis, tending to rotate the leading edge of the pad surface away from the bearing surface until an equilibrium position is reached at the tilt angle. The total supporting force on the pad, resulting from the integration over the pad surface of the positive pressure distribution, exactly equals the load applied to the pad in the equilibrium condition. Thus, in equilibrium a minimum, non-zero separation occurs at the trailing edge of the pad, which is dependent on the above-recited parameters. Additionally, a frictional force acts in a direction opposite to the direction of relative lateral motion, but is small enough to be without appreciable effect on the equilibrium geometry.

In another form of the plane slider bearing, the pad is not pivoted and the tilt angle of the pad is structurally fixed, said fixed tilt angle being of equal magnitude to that assumed by a pivoted pad in operation, all other parameters remaining the same.

Further variations of the slider bearing are possible. For instance, neither the pad surface nor the bearing surface need to be planes. If one surface is convex relative to the other one, the system will operate as a crown bearing. It should be noted that minimum separation in the plane slider bearing occurs at the trailing edge of the pad. In the crown bearing, the point of minimum separation may be positioned more conveniently. Furthermore, in the crown bearing the pivot point may be at the center of the pad. In the slider bearing this is theoretically impossible since the total integrated supporting force on the pad would then equal zero and could not balance the applied load.

The instant invention consists of the utilization of the hydrodynamic effect described above to obtain constant separation between the pole face surface of a magnetic head and the recording surface of a magnetic medium, in high-density magnetic data storage systems. In practice, the two surfaces are biased toward each other through the application of force. Thereafter, an exchange of data between the pole pieces and the recording surface may be effected. Relative lateral motion of the two surfaces is initiated to expose different portions of the recording surface to the action of the magnetic head. In one embodiment, one of the surfaces is pivotally arranged with respect to the other one to form the desired angle of inclination, or tilt angle, therewith. A lubricating fluid is applied to keep at least a portion of the space between the surfaces filled. The relative lateral motion of the surfaces produces fluid flow which develops a hydrodynamic effect to cause the leading edge of the pivotally mounted surface to increase its spacing from the recording surface relative to the trailing edge. The hydrodynamic effect further exerts a lifting force, a component of which balances the biasing force at a predetermined spacing of the surfaces. It will be understood that the identical equilibrium condition may be achieved where no pivoting is used and the tilt angle between the surfaces is structurally fixed, all other parameters remaining the same.

An efficient economical method has thus been provided to maintain constant separation between the pole face surface of a magnetic head and the recording surface of a magnetic medium, the separation spacing being readily controllable between 0 and ½ mil and hence small enough to permit high-density magnetic recording.

In providing means for carrying out the invention, each of the magnetic head assemblies which form the subject matter of this application comprises a mounting unit adapted to be mounted on a fixed bracket, a force arm unit, spring means intermediate said units urging said force arm unit in one direction while restraining all other degrees of freedom, a magnetic head member comprising at least one magnetic head element and its associated pole face surface adapted to confront the recording surface of a magnetic medium, means to transmit the force exerted by said force arm unit to said head member, and means positioning said head member at a tilt angle with respect to the recording surface.

With reference now to the drawings, and more particularly to Fig. 1 thereof, two identical pole pieces 11 are shown, positioned in mirror image arrangement with the ends abutting to form a magnetic circuit. Ends 12 are positioned in contact with each other while tapered ends 13 have a piece of non-magnetic shim metal 15 interposed therebetween to form a gap in said magnetic circuit. Tapered ends 13 and spacer 15 are ground optically flat to form a common pole face surface 14, as better illustrated in Fig. 5.

Figure 2:
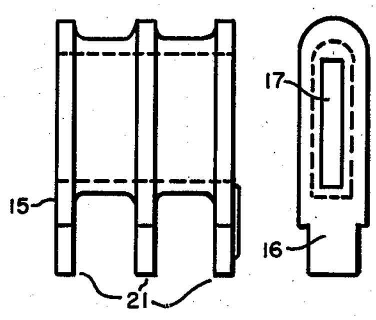
Fig. 2 illustrates the coil bobbin used in the magnetic head.

Fig. 2 illustrates the coil bobbin 16 used in the magnetic recording head. When the head is assembled, opening 17 of the bobbin surrounds abutting ends 12 of the pole pieces. Two separate coils of wire, or a single coil in two portions, may be carried by the bobbin. Extensions 21 are adapted to receive terminals which are further connected to the signal leads.

Figure 5:
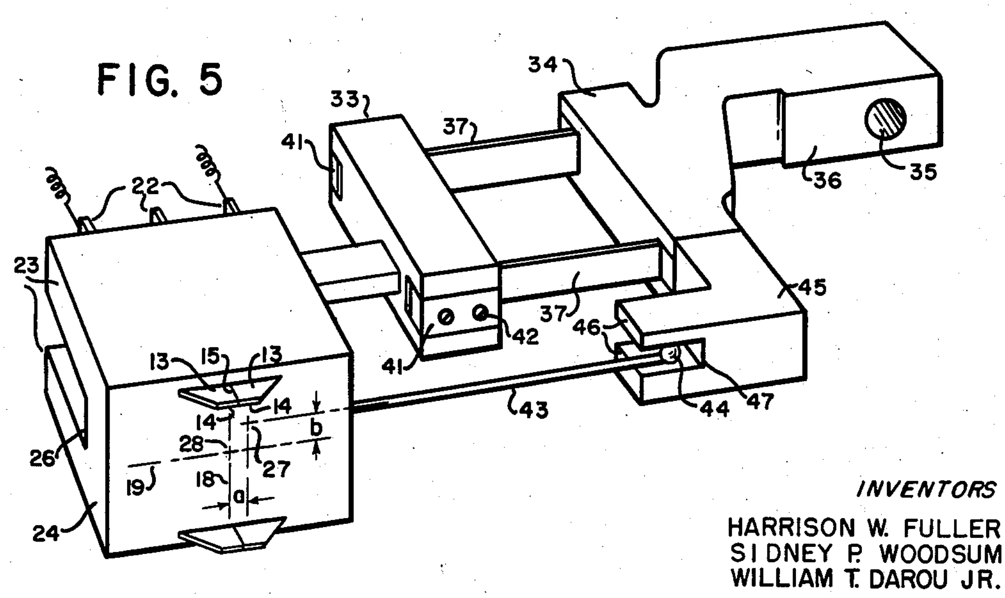
Fig. 5 is an isometric view of the head assembly of Fig. 3.
Figure 3:
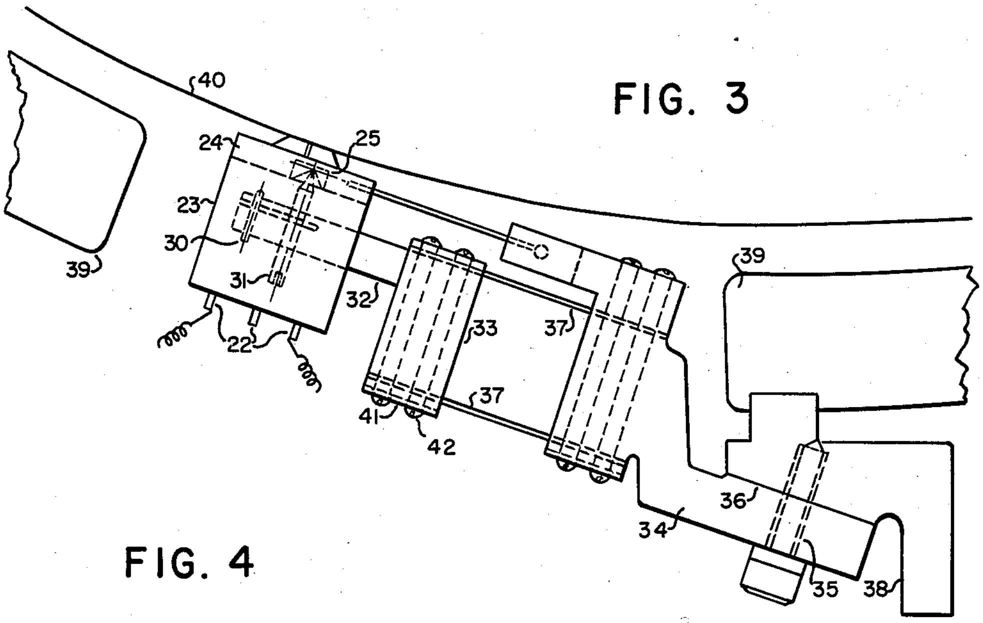
Fig. 3 is a plan view of one embodiment of the magnetic head assembly using a pivoted dual head member.
Figure 4:
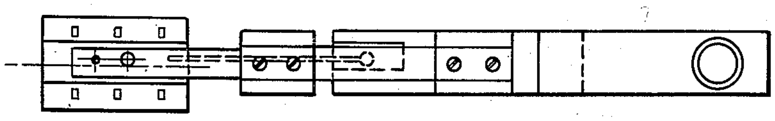
Fig. 4 is an elevation view of the assembly of Fig. 3.

Figs. 3, 4 and 5 illustrate in detail one embodiment of the magnetic head assembly, employing a pivoted dual magnetic head. The pole pieces and associated bobbin of each magnetic head are enclosed in an epoxy resin wafer 23 of rectangular cross section. Terminals 22, which cap extensions 21 of the bobbin, protrude from the edge surface of the resin wafer. Tapering pole piece ends 13 protrude from the opposite edge surface of the resin wafer and terminate in a common rectangular pole face surface having a relatively large length to width ratio and having gap 15 extend centrally across its width. As noted above, the gap need not be positioned centrally of the pole face surface if the location of the pivot point is moved accordingly. Epoxy resin wafers 23, which serve the function of a supporting structure for the pole pieces, are joined by pivot plate 24 and are molded into a unitary structure. The resulting head member comprises identical wafers positioned symmetrically and spaced in parallel, superposed relationship, respective pole face surfaces lying in a common plane. Pivot plate 24 carries a conical pivot bearing 25 which is flush with the inside surface 26 of the pivot plate. As best shown in Fig. 5, axis 27 of the pivot bearing is displaced predetermined distances *a* and *b* respectively, from center lines 18 and 19 of the pivot plate, the dimensions of these displacements being exaggerated in the drawing for the sake of clarity. A pivot bearing pin 31, adapted to mate with the pivot bearing, is carried by pivot pin carrying arm 32 and is fastened thereto by a split-end locking arrangement 30. Pivot pin carrying arm 32 is attached to the lower end of force arm unit 33. Fixture unit 34 and force arm unit 33 are joined by two flat leaf springs 37. Each of these units comprises a bar of square cross section having both its ends traversed by a shallow rectangular slot adapted to receive the leaf springs. Spacers 41 ride on top of the leaf springs in each of the slots, said spacers and leaf springs being fastened to the units by screws 42. Mounting unit 34 further comprises an extension having a mounting surface 36 adapted to engage a fixed bracket 38 by means of a fastening bolt through bore 35. Mounting unit 34 further carries a stabilizing unit 45 comprising a milled assymetrical slot 47 which defines two limit stops 46. A circular positioning rod 43 is partially embedded in pivot plate 24, in line with bearing axis 27. The free end of positioning rod 43 terminates in a sphere 44 having a diameter larger than that of the rod. Sphere 44 is adapted to ride in slot 47, limit stops 46 restricting angular motion of said head member about axis 27 and consequently inhibiting skewing of its pole face surfaces.

As best shown in Fig. 3, the magnetic head assembly is mounted on fixed bracket 38, which in turn is mounted on drum housing 39 surrounding the drum. The surface of the drum constitutes recording surface 40. In this position, leaf springs 37 urge force arm unit 33 toward the recording surface, such force being transmitted to the pivot bearing pin by means of pinholder arm 32. The force on the pivot bearing pin is further transmitted to the pivot bearing and hence to the pole face surfaces, urging the latter against recording surface 40. Leaf springs 37, while permitting motion of the bearing pin in a direction to vary the spacing between the pole face and the recording surfaces, restrain all other degrees of freedom of the bearing pin. The pivot bearing permits pivotal motion of the dual magnetic head member relative to the bearing pin and consequently permits angular positioning of the pole face surfaces relative to the recording surface, while rotary motion of said head member about axis 27 normal to the plane of the pole face surfaces and coincident with the pivot pin axis, is circumscribed by limit stops 46.

Figure 6:
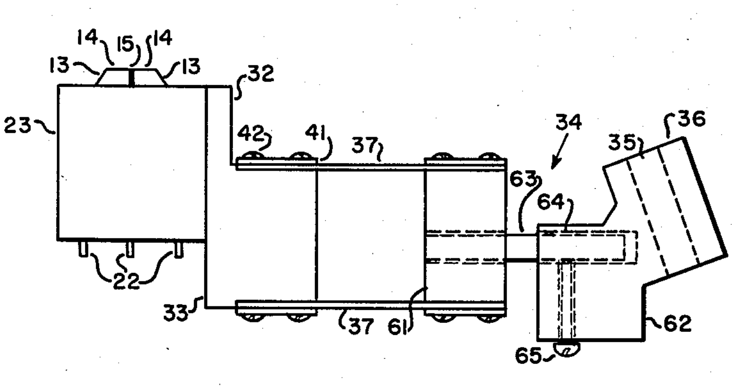
Fig. 6 is a plan view of another embodiment of a magnetic head assembly using a single head having a fixed tilt angle.
Figure 7:
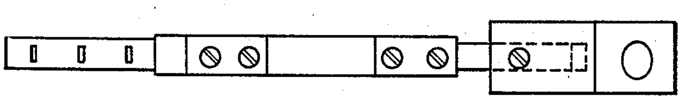
Fig. 7 is an elevation view of the assembly of Fig. 6.

Figs. 6 and 7 illustrate a magnetic head assembly employing a head member having a single head positioned at a fixed tilt angle relative to the recording surface, when the assembly is mounted. It will be understood that a plurality of heads may be used with the instant head mount, if desired. For the sake of simplicity, the same reference numerals are employed to label corresponding parts of the assemblies shown in Figs. 6 and 7, and Figs. 3–5, respectively. It will be noted in Fig. 6, that magnetic head wafer 23 is rigidly attached to force arm unit 33. Mounting unit 34 consists of two parts comprising a fixture unit 61 and spring holder unit 62. The spring holder unit comprises slots 37, spacers 41 and screws 42 identical to those of force arm unit 33, to receive and fasten respectively, leaf springs 37. The spring holder unit further includes a fixed dowel pin 63 which mates with bore 64 in the fixture unit, and is adjustably fixed in said bore by means of set screw 65. As in the case of the pivoted head assembly, mounting surface 36 is adapted to engage a fixed bracket on the drum housing and to be mounted thereon.

The angle described by mounting surface 36 relative to pole face surface 14 is critical, since it will determine the tilt angle of the pole face surface relative to the recording surface. In the instant case, the mounting surface will cooperate with a fixed bracket of uniform rectangular cross section to determine the tilt angle. Alternatively, the arrangement shown in Fig. 3 may be used. There, the mounting surface 36 is parallel to the leaf springs and the desired tilt angle is determined by the shape of the fixed bracket. It should be noted that the precise angle of the fixed bracket is critical when used with a fixed tilt angle head, but is not critical in the assembly of Fig. 3. In that case, the angular self-alignment of the pivoted head will cause the pole face surface to assume the desired tilt angle under a given set of operating conditions.

Returning now to Fig. 6, loosening of set screw 65 permits angular adjustment of dowel pin 63 about its own axis, as well as lateral adjustment along the same axis. Since the dowel pin is rigidly attached to the spring holder unit, such motion will be transmitted to the latter and subsequently to pole face surface 14. Accordingly, if fixture unit 62 is mounted on the fixed bracket, the pole face surface may be aligned with the recording surface, and the gap may be positioned as desired. After the desired alignment is obtained, the set screw is tightened thereby preventing further movement of the dowel pin and fixing the position of the pole face surface. After the assembly is mounted on the fixture bracket, the leaf springs exert a constant biasing force which urges the pole face surfaces of each head against the recording surface.

Figure 8:
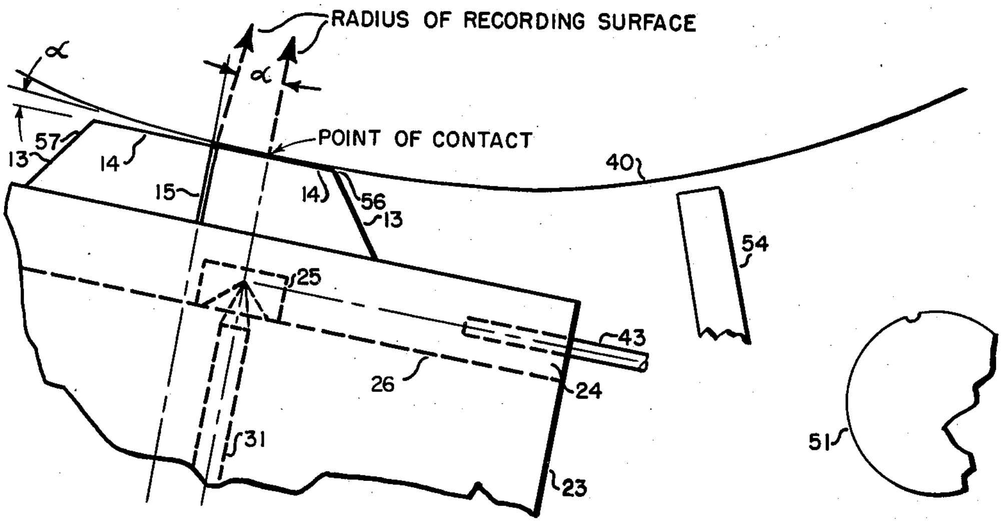
Fig. 8 illustrates the operation of the apparatus prior to the application of fluid with the drum at rest, using the pivoted dual head member as an example.

The position of the head relative to the recording surface, prior to the application of oil and the initiation of drum rotation, is illustrated in Fig. 8. The biasing force of the leaf springs is transmitted to the head member through the pivot pin, urging pole face surface 14 into contact with the recording surface. In the static state, the pivot pin axis is aligned with a drum radius and is intersected by the line of contact along the recording surface. The pole face surface is out of contact with the recording surface in the vicinity of the gap and forms an angle $\alpha$ with a line tangent to the recording surface opposite the gap. The point of contact on the pole face surface is located in line with the pivot pin axis, as shown.

Figure 9:
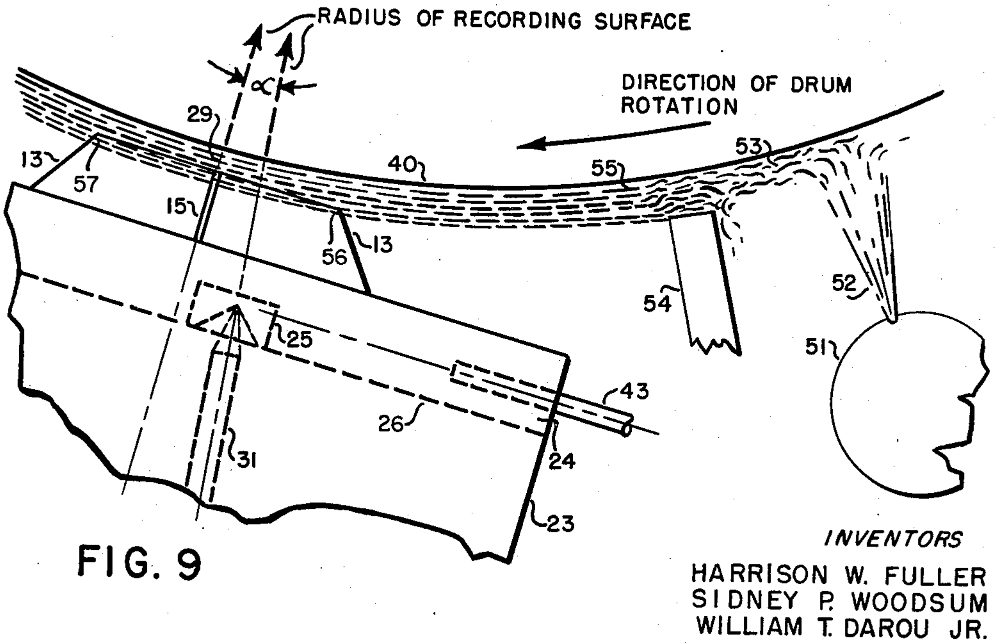
Fig. 9 illustrates the operation of the apparatus of Fig. 8 when fluid is applied and the drum is in motion.

Fig. 9 illustrates the operation of the hydrodynamic effect in the apparatus herein employed. After drum rotation is initiated, oil streams 52 are sprayed onto the recording surface from oil gallery 51. Wiper 54 diverts the excess oil applied and smooths out initial turbulence 53 to form a uniform film 55 on the recording surface. It should be noted that the thickness of the oil film is not critical and may vary in the instant case from 0.7 mil to 20 mils. The lower limit is established by the minimum equilibrium separation which is desired at the gap and is based on the requirement that the entire pole face surface 14 be exposed to the oil. It will be evident from the drawings, that the sides of the pole pieces will be slightly submerged in the oil in this case. The upper limit corresponds to the distance pole pieces 13 protrude from head 26. A film thickness in excess of 20 mils will result in an undesirable contribution to the hydrodynamic supporting force from the lower head surface. The lateral motion of the recording surface is imparted to the film on the recording surface and creates a flow of oil relative to each pole face surface. The hydrodynamic effect causes leading edge 56 of the pole face surface to increase its spacing from the recording surface relative to trailing edge 57, the resultant moment rotating the pole face surface through the tilt angle $\alpha$ into a position where the gap assumes a point of minimum separation 29 from the recording surface. Concurrently, a component of force of the total hydrodynamic effect developed, exerts a lift on the pole face surface urging the latter away from the recording surface until equilibrium is reached between the biasing force and said component of force at a predetermined spacing 29, as measured radially at the gap. Since the spacing of the pole face surfaces of the dual head member from the recording surface, as measured at their gaps, is critcial, it is desirable that the pole face surfaces be free to align themselves so that the minimum spacing occurs at the gaps. In pursuance of this goal, pivot bearing 25 is located a predetermined distance *a* from center line 18 dividing the length of the pivot plate. The moment applied to the pole face surfaces by the hydrodynamic effect, together with the hydrodynamic lift component, is now able to oppose the biasing force and to determine the spacing of the gaps from the recording surface. If the gaps are not located centrally of the pole face surfaces, the point of load application, i.e. the pivot point, must be moved accordingly in order to obtain minimum spacing at the gaps.

A special problem is posed by the mounting of the dual head member. In the mounted position, the wafers 23 and their protruding pole piece ends 13 are positioned horizontally in superposed relationship along the drum axis. Inasmuch as the pivot bearing is located on the pivot plate and hence not at the center of gravity of the dual head member in its mounted position, the location of the pivot bearing on center line 19, as seen in Fig. 5, would cause a rotational moment to exist so as to unbalance the loading forces exerted by the two heads in favor of the lower one in the drawing. To counteract this moment, the center of the bearing is located a predetermined distance *b* from center line 19. It should be noted, that any rotational moment of the head member which may thereafter exist is offset by the pontoon action of the pole face surfaces on the film of oil. Specifically, any undue force causing one of the pole face surfaces to assume a greater than desired spacing from the recording surface, will diminish the spacing of the other pole face surface relative to the recording surface and hence increase the hydrodynamic force thereon which counteracts such motion. Accordingly, the pontoon-like structure of the head member serves as an equalization apparatus to maintain constant and equal spacing of both pole face surfaces from the recording surface.

The operation of the fixed tilt angle assembly of Figs. 6 and 7 is similar to the operation described above. Provided such parameters as the speed of the recording surface, the viscosity of the lubricant, the geometry of the pole face surface etc., are the same in the instant case as in the apparatus of Fig. 5, the same tilt angle will be required. Accordingly, mounting surface 36 will be inclined at the proper angle to obtain the required tilt angle of pole face surface 14 relative to the recording surface. In operation, hydrodynamic lubrication will be obtained if the operating conditions recited above are identical.

It will be readily seen that an exchange of information between the pole pieces and the recording surface of the magnetic medium may be effected through terminals 22 in both of the embodiments described, while maintaining constant separation between the pole face surfaces and the recording surface. Numerous variations are possible in the apparatus herein described while still remaining within the scope of the present invention. Unlike boundary lubrication, while generally relies on a thin film of oil for smooth contact between the surfaces, the present invention may utilize either a liquid or a gas, preferably oil or air respectively, to achieve hydrodynamic lubrication. Although the use of air as a lubricant will entail simpler apparatus, since the boundary layer of the moving surface may be relied on to maintain fluid flow, the use of oil has the advantage of providing a washing action of the two surfaces which will prevent damage to the surfaces incurred by loose particles of metal or dirt. Removal of these particles will also prevent the temporary lifting of the heads and the subsequent loss of data.

Where pivoting of the head is used, a pivot point, as well as a pivot axis may be employed. In the latter case, the need for a stabilizing unit is obviated since skewing of the pole face surfaces is impossible. On the other hand, the procedure for aligning the pole face surfaces with the recording surface will follow closely that described in connection with the fixed tilt angle head, there being no pontoon action here to bring about self-alignment of these surfaces.

The magnetic head and its pole face surface may have any desired shape although the latter will at least in part be determined by such factors as the recording requirements, the shape of the recording medium, the relative configuration of both surfaces, the velocity of fluid flow, the nature of the fluid used and the manner of its application. Inasmuch as the configuration of the recording surface of the magnetic medium is largely governed by electrical design considerations, the pole face surface of the magnetic head must be shaped to take into account the above mentioned parameters. For example, it will be readily seen that smaller equilibrium separation is obtained when the fluid used is a low viscosity gas instead of a liquid. Similarly, the smaller the viscosity of a given liquid used, the smaller the hydrodynamic supporting force and hence, the smaller the separation obtained. Since relative surface speed determines the velocity of fluid flow, it will also determine the hydrodynamic supporting force exerted. Where relative surface speed and the viscosity of the lubricant are constant, the hydrodynamic force will be a function of surface area. The greater the area of the surface, the greater the force exerted thereon. Additionally, the component of hydrodynamic force available to balance the biasing force is dependent on the relative configuration of the pole face and recording surfaces, respectively. If both are flat, and there is relative lateral motion between them, the system will operate like a plane slider bearing. Where the system operates as a crown bearing the equilibrium separation obtained, all other factors remaining equal, will be different from that of the slider bearing. Accordingly, the above mentioned factors will largely determine the shape of the head and its pole face surface.

The possibility of changing the location of the gap and the point of load application in the crown bearing has already been discussed. Variation is also possible in the manner of supporting the heads. Head mounts carrying a plurality of heads are feasible or, alternatively, a unitary structure may be provided having respective pairs of pole pieces embedded in its surface. Additionally, a single spring structure may be used in place of the multiple spring arrangement described above.

Having thus described the invention, it will be apparent that numerous modifications and departures may now be made by those skilled in the art. Consequently, the invention herein disclosed is to be construed as limited only by the spirit and scope of the appended cliams.

What is claimed is:

1. A magnetic recording head assembly for high-density magnetic data storage on a recording surface comprising at least one magnetic head element including a pole face surface, said pole face surface being adapted to confront said recording surface, means for mechanically supporting said head element consisting of a force arm unit adapted to transmit pressure to said head element, a mounting unit including a mounting surface adapted to engage a fixed bracket, leaf spring means coupling said mounting unit and said force arm unit to bias said pole face surface toward said recording surface, said pole face surface being adapted to maintain a predetermined tilt angle with respect to said recording surface when said mounting surface engages said bracket, said leaf spring means permitting relative motion of said units solely in a direction to vary the spacing between said pole face surface and said recording surface.

2. The apparatus of claim 1, wherein said pole face surface is planar, the length of said pole face surface in the direction of relative motion of said recording surface being large compared to its width, said width being traversed by a magnetic gap, said gap being located at the point of minimum spacing between said recording surface and said pole face surface when the latter is positioned at said predetermined tilt angle.

3. A magnetic recording head assembly for high-density magnetic data storage on a recording surface comprising at least one magnetic head element including a pole face surface, said pole face surface being adapted to confront said recording surface, a force arm unit adapted to transmit pressure to said head element and rigidly affixed thereto, a mounting unit including a mounting surface engaging a fixed bracket, said pole face surface being positioned in fixed angular relationship to said mounting surface to maintain a predetermined tilt angle with respect to said recording surface, spring means coupling said mounting unit and said force arm unit to bias said pole face surface toward said recording surface, said spring means permitting relative motion of said units solely in a direction to vary the spacing between said pole face surface and said recording surface.

4. The apparatus of claim 3, wherein said mounting unit comprises a spring holder unit and a fixture unit, said fixture unit including said mounting surface, said spring holder unit being moveably adjustable with respect to said fixture unit when the latter engages said fixed bracket to align said pole face surface relative to said recording surface.

5. The apparatus of claim 4, wherein said spring holder unit comprises a dowel pin rigidly attached thereto, said fixture unit comprising a bore adapted to mate with said dowel pin and an adjusting screw adapted to enter said bore and fix said dowel pin therein.

6. A magnetic recording head assembly for high-density magnetic data storage on a recording surface comprising at least one magnetic head element including a pole face surface, said pole face surface being adapted to confront said recording surface, a force arm unit adapted to transmit pressure to said head element, pivotal linking means interposed between said force arm unit and said head element to permit pivotal motion of said pole face surface relative to said recording surface, a mounting unit including a mounting surface adapted to engage a fixed bracket, leaf spring means coupling said mounting unit and said force arm unit to bias said pole face surface toward said recording surface, said pole face surface being adapted to maintain a predetermined tilt angle with respect to said recording surface when said mounting surface engages said bracket, said leaf spring means permitting relative motion of said units solely in a direction to vary the spacing between said pole face surface and said recording surface.

7. The apparatus of claim 6, wherein said pivotal linking means comprises a conical pivot bearing and a mating pivot pin substantially normal to said pole face surface, said pivot pin comprising the axis of pivotal motion.

8. The apparatus of claim 7, wherein said axis of pivotal motion is located a predetermined distance from said gap, as measured along the length of said pole face surface.

9. The apparatus of claim 7, wherein limiting means are provided to confine the rotary motion of said recording surface about the pivot pin axis normal to said pole face surface.

10. The apparatus of claim 9, wherein said pole face surface is planar, the length of said pole face surface in the direction of relative motion of said recording surface being large compared to its width, said pole face surface being traversed by a gap located centrally of the length thereof.

11. The apparatus of claim 10, wherein said pivot bearing is affixed to said head element and said mating pivot pin is carried by said force arm unit.

12. The apparatus of claim 11, wherein said limiting means comprises two limit stops, an extension of said head element adapted to ride between said limit stops, the angular motion of said extension about said pivot pin axis being confined by said stops.

13. A magnetic head assembly for high-density magnetic data storage, said assembly having two magnetic heads, each of said heads comprising a thin resin wafer, two flat, yoke-shaped pole pieces embedded in mirror image position in said resin wafer, said pole pieces having their ends positioned in abutting relationship to establish a magnetic circuit, a bobbin surrounding two of said abutting ends, a coil of wire wrapped around said bobbin having its terminals protrude from one edge surface of said wafer, the other two of said abutting pole piece ends protruding from the opposite edge surface of said wafer, said protruding ends having a thin spacer of non-magnetic shim metal interposed therebetween to form a gap in said magnetic circuit, said pole pieces and interposed spacer being ground optically flat to form a comon pole face surface having a relatively large length to width ratio and having said gap extend centrally across its width, said heads being spaced from each other in parallel, superposed relationship whereby respective pole face surfaces lie in a common plane, a resin pivot plate, said wafers being joined symmetrically into a unitary structure with said pivot plate, a conical jewel pivot bearing embedded in said pivot plate having its opening flush with the inside surface of said plate between said wafers, the center of said pivot bearing being located closer to one of said wafers than to the other and being spaced a predetermined distance from said gap as measured along the length of said pole face surfaces, a stabilizing rod partially embedded in said pivot plate, said stabilizing rod being positioned parallel to the long edges of said pole face surfaces and being aligned with the center of said bearing, the free end of said stabilizing rod terminating in a sphere having a diameter greater than said rod, a head mount comprising a force arm unit and a mounting unit positioned in mutually facing relationship, said mounting unit including a mounting surface adapted to engage a fixed bracket, each of said units being traversed by two shallow slots, two leaf springs joining said units and peened, respectively, into correspondnig slots thereof, said leaf springs permitting motion of said force arm unit in a predetermined direction relative to said mounting unit while restraining all other degrees of freedom thereof, a pin holder arm attached to said force arm unit and extending therefrom in the direction of said slot traversal, said pin holder arm adapted to have a portion thereof ride centrally between said wafers above the inside surface of said pivot plate, the width of said pin holder arm being traversed by a split end groove, an off-center drill hole traversing the depth of said arm, a split end locking member carried by said arm adjacent said drill hole, a pivot pin locked in said drill hole and adapted to ride in said off-center jewel bearing, a stabilizing unit attached to said mounting unit, said stabilizing unit comprising a bar of square cross section having a milled slot traversing the length thereof, said slot being adapted to receive said terminating sphere and a portion of said stabilizing rod to confine the angular motion of said rod about the pivot pin axis.

14. A magnetic head member having at least one magnetic head element, said magnetic head element comprising magnetic circuit means having at least one pair of abutting ends, said pair of ends being separated to establish a gap in said magnetic circuit and terminating in a common pole face surface having large length to width ratio, the width of said pole face surface being traversed by said gap, a supporting structure to carry said magnetic circuit means, said supporting structure further carrying bearing means to permit pivotal motion of said head element, said bearing means comprising a conical pivot bearing adapted to mate with a pivot pin, the axis of said pivot bearing perpendicularly intersecting said pole face surface a predetermined distance from said gap.

15. The apparatus of claim 14, wherein said supporting structure further carries a stabilizing rod, said stabilizing rod being adapted to ride between two limit stops to confine the angular motion of said magnetic head member about the axis of the pivot bearing.

16. A dual magnetic head member having two magnetic head elements, each of said head elements comprising magnetic circuit means having at least one pair of abutting ends, said pair of ends being spaced to establish a gap in said magnetic circuit and terminating in a common pole face surface having a relatively large length to width ratio, the width of said pole face surface being traversed by said gap, a supporting structure to carry each of said magnetic circuit means, a rectangular pivot plate symmetrically joining said two head elements, said head elements being spaced from each other in parallel, superposed relationship whereby respective pole face surfaces lie in a common plane, a conical pivot bearing carried by said pivot plate, the center of said pivot bearing being spaced from center lines dividing the length and width of said rectangular pivot plate.

17. The apparatus of claim 16, wherein said pivot plate further carries a stabilizing rod, said stabilizing rod being adapted to ride between two limit stops to confine the angular motion of said magnetic head member about an axis through said pivot bearing normal to the common plane of said pole face surfaces.

18. A dual magnetic head member comprising two magnetic heads, each of said heads comprising a thin resin wafer, two flat, yoke-shaped pole pieces embedded in mirror image position in each of said resin wafers, said pole pieces having their ends positioned in abutting relationship to establish a magnetic circuit, a bobbin surrounding two of said abutting ends, a coil of wire wrapped around said bobbin having its terminals protrude from one edge surface of said wafer, the other two of said abutting pole piece ends protruding from the opposite edge surface of said wafer, said protruding ends having a thin spacer of non-magnetic shim metal interposed therebetween to form a gap in said magnetic circuit, said pole pieces and interposed spacer being ground optically flat to form a rectangular pole face surface having a relatively large length to width ratio and having said gap extend centrally across its width, said heads being spaced from each other in parallel, superposed relationship whereby respective pole face surfaces lie in a common plane, a resin pivot plate, said wafers being joined symmetrically into a unitary structure with said pivot plate, a conical pivot bearing embedded in said pivot plate having its opening flush with the inside surface of said plate between said wafers, the center of said pivot bearing being located closer to one of said heads than to the other and being spaced a predetermined distance from said gap as measured along the length of said pole face surfaces, a stabilizing rod partially embedded in said pivot plate, said stabilizing rod being positioned parallel to the long edges of said pole face surfaces and being aligned with the center of said bearing, the free end of said stabilizing rod terminating in a sphere having a diameter greater than said rod, said free end adapted to ride between two limit stops to confine the motion of said magnetic head member about an axis through said pivot bearing normal to the comon plane of said pole face surfaces.

19. In a head mount assembly for supporting at least one high-density magnetic recording head, a mounting unit, a force arm unit, each of said units being traversed by two shallow slots, two leaf springs joining said units and peened, respectively, into corresponding slots thereof, said leaf springs permitting motion of said force arm unit in a predetermined direction relative to said mounting unit while restraining all other degrees of freedom thereof, said mounting unit further comprising a mounting surface adapted to engage a fixed bracket, said force arm unit further comprising a pinholder arm extending therefrom in the direction of traversal of said slots, the width of the free end of said pinholder arm being traversed by a split-end groove, an off-center drill hole traversing the depth of said pinholder arm, a split end locking member carried by said arm adjacent said drill hole, and a pivot bearing pin locked in said drill hole.

20. The apparatus of claim 19, wherein the axis of said pivot pin extends substantially in the direction of motion permitted by said leaf springs, said head mount assembly further including a stalilizing unit, said stabilizing unit comprising two limit stops adapted to mate with a stabilizing rod to restrict the movement thereof.

21. The apparatus of claim 20, wherein said stabilizing unit comprises an arm of square cross section parallel to said leaf springs, said arm being traversed by a milled slot, the two remaining portions of said arm on either side of said slot constituting said limit stops.

22. In a head mount assembly for supporting at least one high-density magnetic recording head, a mounting unit comprising a spring holder unit and a fixture unit, a force arm unit adapted to fixedly engage at least one magnetic head, leaf spring means joining said force arm unit and said mounting unit, said fixture unit comprising a mounting surface adapted to engage a fixed bracket, said spring holder unit being moveably adjustable with respect to said fixture unit, said leaf spring means urging said force arm unit in a predetermined direction relative to said mounting surface when the latter engages said fixed bracket while restraining all other degrees of freedom thereof.

23. In a head mount assembly for supporting at least one magnetic recording head, a mounting unit, said mounting unit comprising a spring holder unit and a fixture unit, a force arm unit adapted to fixedly engage at least one magnetic head, said spring holder unit and said force arm unit, respectively, being traversed by two shallow slots, said spring holder unit further comprising a dowel pin rigidly attached thereto, said mounting unit comprising a bore adapted to mate with said dowel pin, an adjusting screw on said mounting unit adapted to enter said bore and fix the dowel pin therein, said mounting unit further comprising a mounting surface arranged in fixed angular relationship to said force arm unit, two leaf springs joining said force arm unit and said spring holder unit by engaging corresponding slots thereof, said leaf springs urging said force arm unit in a predetermined direction relative to said mounting surface when the latter engages said fixed bracket while restraining all other degrees of freedom thereof.

References Cited in the file of this patent

UNITED STATES PATENTS

| | | |
|---|---|---|
| 2,531,642 | Potter | Nov. 28, 1950 |
| 2,673,249 | Ericksson | Mar. 23, 1954 |
| 2,680,785 | Franklin | June 8, 1954 |
| 2,761,016 | Muller | Aug. 28, 1956 |
| 2,769,037 | Dank | Oct. 30, 1956 |
| 2,772,135 | Hollabaugh et al. | Nov. 27, 1956 |
| 2,802,905 | Taris | Aug. 13, 1957 |